Feb. 28, 1967  K. V. PEPPER  3,306,962
PLASTIC CORRUGATED PIPE
Filed March 29, 1965
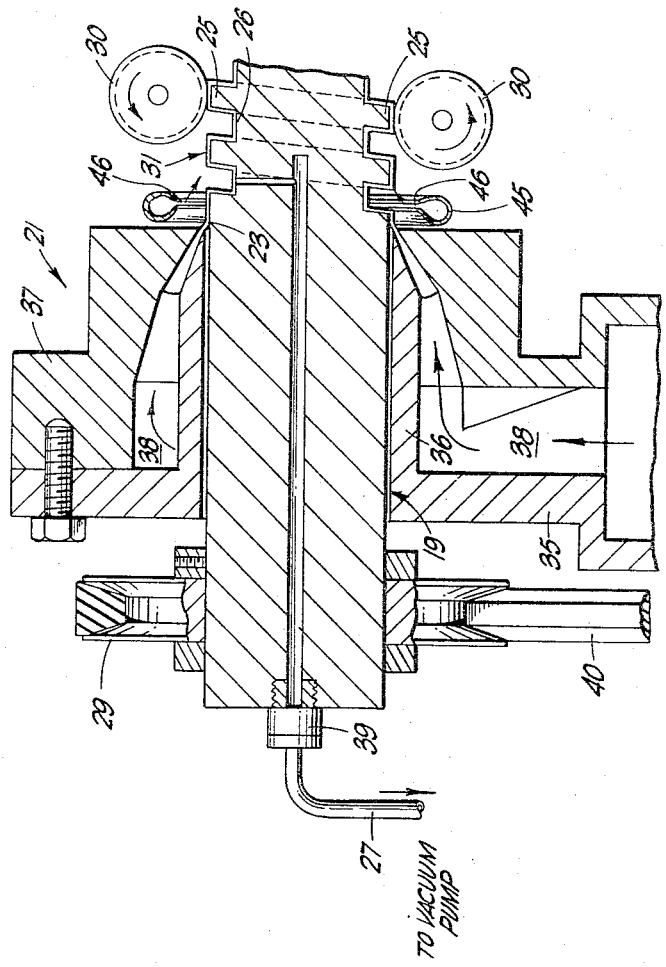
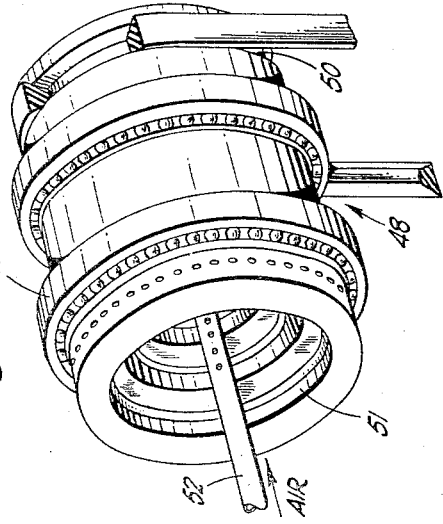
INVENTOR
KENNETH V. PEPPER
By:- Smart & Biggar
ATTORNEYS

United States Patent Office

3,306,962
Patented Feb. 28, 1967

3,306,962
PLASTIC CORRUGATED PIPE
Kenneth V. Pepper, Beaconsfield, Quebec, Canada, assignor to Building Products of Canada Limited, Montreal, Quebec, Canada
Filed Mar. 29, 1965, Ser. No. 443,518
12 Claims. (Cl. 264—90)

This invention is directed to a plastic corrugated pipe, the method of manufacturing the pipe, and to apparatus for carrying out the method of manufacture.

The use and manufacture of pipe having helically extending corrugations in its wall is well known. Previously, pipes of similar types have been produced by fabrication from strips of material, and also by extrusion through an eccentric die. Prior methods using strips of material have generally entailed simultaneous feeding of a plurality of strips of prepared material tangentially onto a suitable form, so that the edges of the strips overlap to produce a laminated wall structure. In the case of materials such as rubber or plastic, the strips are then bonded or vulcanised to form a coherent walled structure. Due to the need for using strip material, and to rotate the so-formed pipe relative to the in-fed material, the production of extended lengths of pipe is difficult, and the process is both complex and costly, and requires extensive apparatus. Pipe produced by this method is not well suited for subsequent treatment such as slitting of the wall in the preparation of drainage pipe, and is not well suited for the conventional joining of adjacent lengths as by "welding."

In a known method of pipe production using an extrusion apparatus having an annular crosshead die with a non-symmetrical extrusion path, a thickening or protrusion of the extruded pipe is obtained. This protrusion may be in the form extending as a helix about the wall of the tube. However, the tube so produced is of non-uniform wall thickness, and the form of the helically extending protrusion is very limited as to the profile obtainable. In addition, the method entails rotation of the extruded pipe, thus limiting the practical length that can be produced in one piece.

An object of the present invention is to provide a plastic pipe of substantially uniform wall thickness, and having a homogeneous wall with a helically extending corrugation formed therein.

A further object is the manufacture by extrusion of continuous extended lengths of plastic pipe with helically extending corrugations in the wall thereof.

A further object is the provision of an extruding apparatus for the manufacture of extended lengths of helically extending corrugations in the wall thereof.

In the following, the term mandrel shall be understood to include rotatable forming members having either an inner or an outer surface adapted to carry out a forming process.

According to the present invention there is provided an elongated rotatable mandrel of cylindrical form having a surface thereof in thread-like convolution, means to rotate said mandrel, means to feed a settable plastic material onto said thread-like convoluted surface, and means to prevent rotation of the plastic material with the mandrel after the plastic has set so that rotation of the mandrel produces longitudinal feeding of the formed plastic from the mandrel.

Preferred embodiments of the present invention are illustrated in the following drawings in which:

FIGURE 1 shows a longitudinal section through a pipe-extruding apparatus according to the present invention using a male mandrel form; and FIGURE 2 is a longitudinal section of a rotary mandrel of female form for use with a further embodiment of the extruding apparatus.

The extrusion apparatus shown in FIGURE 1 comprises an annular extruding crosshead die 21 having a rotary mandrel 22 extending therethrough. Fluid plastic forced through the annular nozzle 23 of the extending die is deposited upon the external surface 24 of mandrel 22, which is illustrated as having at least one helical corrugation 25 extending therealong in thread-like form.

The crosshead die 21 comprises a plate member 35 having an extended cylindrical housing 36 attached thereto and surrounded by a cover 37, to form an annular extrusion chamber 38, which terminates at the annular nozzle aperture 23.

Plastic is fed to the chamber 38 in the usual fashion by a pump (not shown).

The rotary mandrel 22 is shown journalled for rotation in housing 36 of the crosshead die 21, by way of a plain bearing 19. Ball or roller type bearings may be employed, instead.

The convoluted surface portion of the mandrel 22 which receives the extrudate is coated with a low-friction material such as polytetrafluorethylene, or a silicone low-friction compound, or may be of a highly polished hard chromed material.

The mandrel 22 includes a series of suction orifices 26 located at the root of the thread-like corrugation. Suction is provided to conform the extruded plastic to the mandrel by a vacuum pump (not shown) connected to the section gallery 27 by way of a gland and stuffing box 39.

Rotation of the mandrel 22 is effected by the pulley 29 driven by a V belt 40 from a variable speed electric motor (not shown). Alternatively, a gear drive of infinitely variable ratio may be employed as the driving means, which is generally also used to drive the pumping means supplying plastic to the die 21.

The temperature of the extruded plastic as it is deposited on the surface 24 of the mandrel is controlled by fluid supplied through the annular pipe 45 and nozzles 46. In the case of thermoplastic material such as unplasticised or "rigid" polyvinylchloride (PVC) the fluid is cooling air at a temperature of about 100° C. while for thermosetting plastic such as an epoxy resin, the fluid supplied by nozzles 46 may be air heated to a suitable curing temperature. Use of alternative heating means such as radiant heat, induction, or eddy current heating are contemplated.

The apparatus shown in FIGURE 1 includes wheels 30 mounted on axes fixed relative to the die 21 and arranged normal to the axis of rotation of the mandrel 22, so that the wheels 30 are free only to rotate in planes parallel to the mandrel axis.

In operation it will be seen that as fluid plastic is deposited from nozzle 23 upon the surface 24 of mandrel 22 to solidify, it is drawn into conforming relation with the mandrel surface 24 by external air pressure acting on the outer plastic surface, the vacuum source serving to reduce air pressure at the surface of the mandrel to ensure draw-down of the plastic into the root portions of the corrugation.

The temperature control effected by heating or cooling fluid supplied through pipe 45 causes the plastic to set on the surface of the mandrel. The temperature of the plastic is controlled to prevent undue shrinkage of the plastic which would produce gripping contact by the pipe with the mandrel 22.

The rate of rotation of the mandrel 22 is synchronised with the extrusion rate from die 21, so that the plastic is deposited at the desired thickness and is conformed to the mandrel while setting. When the set plastic pipes comes into contact with wheels 30, the wheels by their frictional contact with the external surface of the plastic pipe 31 produce a circumferential force on the pipe to prevent rotation of the pipe 31 with the rotating mandrel 22. As the mandrel 22 is driven in a direction to effect movement of the plastic pipe to the right along the threaded mandrel 22, as illustrated in FIGURE 1, the pipe 31 will be fed longitudinally from the rotating mandrel 22.

Cooling of the extruded pipe by means such as water spray as it leaves the mandrel 22, is contemplated.

The provision of temperature controlling fluid such as cooling water to the mandrel, by supply pipes connected through the gland 39, is also contemplated. Use of a sintered, fluid-permeable mandrel structure for the purposes of applying vacuum suction to the mandrel surface, and/or for distributing temperature control fluid within the mandrel is contemplated.

In FIGURE 2, the mandrel 48 is shown mounted for rotation in bearings 49. As in the case of the other embodiment, a pulley 50 is provided for rotation of the mandrel by a motor (not shown).

In the case of the female-type mandrel 48 plastic is applied to the inner mandrel surface by a suitable annular extrusion die (not shown). The extruded plastic is conformed to the internal thread form 51 by supplying pressurised fluid such as air by way of pipe 52 extending from wtihin the annulus of the die orifice (not shown). The temperature of the pressurising fluid is controlled to provide the desired rate of setting of the plastic, as previously described.

The provision of air bleed holes connecting the root of the thread form of mandrel 48 to the outer surface of the mandrel is proposed to promote conforming of the plastic to the thread form.

Guide wheels similar to the wheels 30 shown in FIGURE 1 may be located within the mandrel 48, to contact the inside of the pipe, or may be located outside the mandrel, to contact the outer surface of the pipe as it emerges from mandrel 48. In this latter arrangement, it is necessary to "start" the process, using a length of preformed pipe extending from the mandrel, and engaged by wheels 30. As the freshly deposited extrudate engages and bonds with the preformed length of pipe, rotation of the pipe is prevented by wheels 30, so that rotation of the mandrel 48 produces outward feeding of the extruded pipe.

What I claim as my invention is:

1. A method for the manufacture of a helically corrugated tube comprising the steps of depositing settable plastic material in unset condition upon a surface of a mandrel having a helical thread form to conform to the thread form of said mandrel surface, securing said plastic material after setting thereof against rotation about the axis of said mandrel, and rotating said mandrel about its longitudinal axis to feed said plastic material from said mandrel.

2. A method for the manufacture of a helically corrugated tube comprising the steps of extruding plastic material in unset condition upon the surface of a mandrel having a thread form so as to conform to the thread form of said mandrel surface, securing said plastic material after setting thereof against rotation about the axis of said mandrel, and rotating said mandrel about its longitudinal axis to feed said plastic material from said mandrel.

3. The method as claimed in claim 2, comprising the step of applying differential fluid pressure to the surface of said settable plastic material to conform the same to the surface of the mandrel.

4. The method as claimed in claim 2, in which the extruded plastic material is a thermoplastic, and setting thereof is obtained by controlled cooling.

5. The method as claimed in claim 2 in which the extruded plastic material is a thermo-setting plastic, and setting thereof is obtained by controlled heating.

6. Apparatus for forming elongated plastic helically corrugated cylinders, comprising an elongated rotatable mandrel of cylindrical form having one surface thereof in thread-like corrugation, means to rotate said mandrel, means to feed a settable plastic material onto said corrugated surface, means to restrain said plastic material against rotation about the longitudinal axis of said mandrel after setting whereby rotation of said mandrel produces longitudinal feeding movements of the formed cylinder from the mandrel.

7. Apparatus as claimed in claim 6, comprising means for applying differential fluid pressure to the surface of said settable plastic material to conform the same to the surface of the mandrel.

8. Apparatus as claimed in claim 6 in which said thread-like corrugation is on the outer surface of said mandrel.

9. Apparatus as claimed in claim 7, comprising a source of suction and means for connecting the same to the root of the thread-like corrugation of the mandrel to apply suction continuously over a portion of the length thereof.

10. Apparatus for forming elongated helically corrugated cylinders of thermo-plastic material, comprising an elongated rotatable mandrel of cylindrical form having an inner surface thereof in helical thread-like corrugation, means to rotate said mandrel, means to feed thermally settable plastic material onto said corrugated surface, means for applying differential fluid pressure to conform the plastic material to the surface of said mandrel, means to control the temperature of said plastic material to produce setting thereof after contact with the surface of said mandrel and means to restrain said plastic material after setting agianst rotation about the longitudinal axis of said mandrel whereby rotation of said mandrel produces longitudinal feeding movement of the formed cylinder from said mandrel.

11. Apparatus as claimed in claim 6, in which said means to feed a setable plastic material comprises an annular extruder die adjacent the corrugated surface of said mandrel.

12. Apparatus as claimed in claim 10, in which said restraining means comprises wheel means mounted for rotation in a plane substantially parallel with the longitudinal axis of said mandrel, and adapted to engage the outer surface of the formed cylinder.

References Cited by the Examiner

UNITED STATES PATENTS

| | | | |
|---|---|---|---|
| 1,659,120 | 2/1928 | Poberejsky | 138—122 |
| 2,396,059 | 3/1946 | Roberts | 138—122 |
| 2,566,846 | 9/1951 | Martin | 18—13 |
| 2,620,514 | 12/1952 | Sampson et al. | 18—13 |
| 2,730,762 | 1/1956 | Ballard | 18—13 |
| 2,817,363 | 12/1957 | Penrose | 138—122 |
| 2,897,840 | 8/1959 | Roberts et al. | 138—122 |
| 3,169,272 | 2/1965 | Maxon | 18—14 |

FOREIGN PATENTS

| | | |
|---|---|---|
| 350,390 | 5/1931 | Great Britain. |
| 716,183 | 9/1954 | Great Britain. |

WILLIAM J. STEPHENSON, *Primary Examiner.*